(12) United States Patent
Yasuda

(10) Patent No.: US 12,157,372 B2
(45) Date of Patent: Dec. 3, 2024

(54) VEHICLE COMPRISING CHANGEOVER DEVICE AND OUTPUT CONNECTOR FOR SUPPLYING DIFFERENT VOLTAGE TYPES

(71) Applicant: TOYOTA JIDOSHA KABUSHIKI KAISHA, Toyota (JP)

(72) Inventor: Satoshi Yasuda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 17/972,850

(22) Filed: Oct. 25, 2022

(65) Prior Publication Data
US 2023/0179115 A1   Jun. 8, 2023

(30) Foreign Application Priority Data
Dec. 8, 2021 (JP) ................ 2021-199393

(51) Int. Cl.
B60L 1/00 (2006.01)
B60L 55/00 (2019.01)
H02M 7/5387 (2007.01)

(52) U.S. Cl.
CPC .............. B60L 1/006 (2013.01); B60L 55/00 (2019.02); H02M 7/53871 (2013.01)

(58) Field of Classification Search
CPC ............ B60L 1/006; B60L 55/00; B60L 2210/40–46; B60L 15/007; B60L 53/14–16; B60L 53/24; B60R 16/03–0373; H02J 2310/46–48; H02M 1/008; H02M 1/009; H02M 1/10; H02M 7/5387–5395
See application file for complete search history.

(56) References Cited

U.S. PATENT DOCUMENTS

| 9,539,903 | B2 | 1/2017 | Kinomura et al. | |
| 2005/0109550 | A1* | 5/2005 | Buglione | B60K 6/48 180/65.25 |
| 2014/0354195 | A1* | 12/2014 | Li | B60L 53/22 318/139 |
| 2019/0047433 | A1* | 2/2019 | Rozman | B60W 20/00 |

(Continued)

FOREIGN PATENT DOCUMENTS

| CN | 107719174 | A | * | 2/2018 |
| DE | 102017221365 | A1 | * | 5/2019 |

(Continued)

OTHER PUBLICATIONS

English machine translation of CN107719174A published Feb. 23, 2018 (Year: 2018).*

*Primary Examiner* — Rexford N Barnie
*Assistant Examiner* — David A Shiao
(74) *Attorney, Agent, or Firm* — Oliff PLC

(57) ABSTRACT

A vehicle has an inverter, a motor, an output connector, and a changeover device. The inverter applies a voltage to a first output wiring line, a second output wiring line, and a third output wiring line. The motor is connected to the first output wiring line, the second output wiring line, and the third output wiring line, and drives a wheel. The output connector supplies the voltage applied to the first output wiring line, the second output wiring line, and the third output wiring line to an outside. The changeover device changes over the voltage supplied from the output connector to the outside.

4 Claims, 6 Drawing Sheets

(56) References Cited

U.S. PATENT DOCUMENTS

| | | | | |
|---|---|---|---|---|
| 2020/0122585 A1* | 4/2020 | Bhat | ................... | G05B 19/0426 |
| 2022/0029329 A1* | 1/2022 | Kempf | ................... | H01R 43/20 |
| 2022/0219549 A1* | 7/2022 | Slepchenkov | .......... | B60L 53/16 |
| 2023/0011289 A1* | 1/2023 | Kim | .................... | H02M 1/4233 |
| 2023/0027005 A1* | 1/2023 | Park | .................. | H02M 3/33573 |

FOREIGN PATENT DOCUMENTS

| | | |
|---|---|---|
| JP | H06-292304 A | 10/1994 |
| JP | 2007-068363 A | 3/2007 |
| JP | 2014-212612 A | 11/2014 |
| JP | 5890345 B2 | 3/2016 |
| WO | 2014/170737 A1 | 10/2014 |

* cited by examiner

VEHICLE COMPRISING CHANGEOVER DEVICE AND OUTPUT CONNECTOR FOR SUPPLYING DIFFERENT VOLTAGE TYPES

CROSS-REFERENCE TO RELATED APPLICATION

This application claims priority to Japanese Patent Application No. 2021-199393 filed on Dec. 8, 2021, incorporated herein by reference in its entirety.

BACKGROUND

1. Technical Field

The art disclosed in the present specification relates to a vehicle.

2. Description of Related Art

A vehicle disclosed in Japanese Unexamined Patent Application Publication No. 2014-212612 (JP 2014-212612 A) has two motors and two inverters. Three output wiring lines of the first inverter are connected to a stator of the first motor. Three output wiring lines of the second inverter are connected to a stator of the second motor. Each of the inverters drives the corresponding motor by supplying alternating-current voltage to the corresponding motor. Besides, this vehicle has a pair of external output wiring lines connected to neutral points of the stators of the motors respectively. This vehicle can supply voltage to the outside via the external output wiring lines.

SUMMARY

In the vehicle of JP 2014-212612 A, when a voltage is output to the external output wiring lines, the three output wiring lines of the first inverter are controlled to the same potential (hereinafter referred to as a first potential), and the three output wiring lines of the second inverter are controlled to the same potential (hereinafter referred to as a second potential). The first potential and the second potential are different from each other. Accordingly, the different potentials are applied to the neutral point of the first motor and the neutral point of the second motor respectively, and a voltage is output between the external output wiring lines. As described hitherto, in the vehicle of JP 2014-212612 A, the two inverters and the two motors are required in outputting the voltage to the external output wiring lines. In the present specification, there is proposed a vehicle that can supply voltage to the outside through the use of a single inverter.

A vehicle disclosed in the present specification has an inverter that applies a voltage to a first output wiring line, a second output wiring line, and a third output wiring line, a motor that is connected to the first output wiring line, the second output wiring line, and the third output wiring line and that drives a wheel, an output connector that supplies the voltage applied to the first output wiring line, the second output wiring line, and the third output wiring line to an outside, and a changeover device that changes over the voltage supplied from the output connector to the outside.

Incidentally, the changeover device may change over the voltage supplied to the outside between an alternating-current voltage and a direct-current voltage, or may change over the magnitude of the voltage supplied to the outside. Besides, in the case where there are three or more external wiring lines, the changeover device may change over the number of voltages supplied to the outside. For example, in the case where there are a first wiring line, a second wiring line, and a third wiring line as the external wiring lines, and the inverter can supply a first voltage between the first wiring line and the second wiring line and supply a second voltage between the second wiring line and the third wiring line, the changeover device may make a changeover between a state where both the first voltage and the second voltage are supplied to the outside and a state where only one of the first voltage and the second voltage is supplied to the outside.

According to this vehicle, voltage can be supplied to the outside by the three output wiring lines of the single inverter. That is, voltage can be supplied to the outside by the single inverter. Besides, in this vehicle, the voltage supplied to the outside can be changed over by the changeover device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
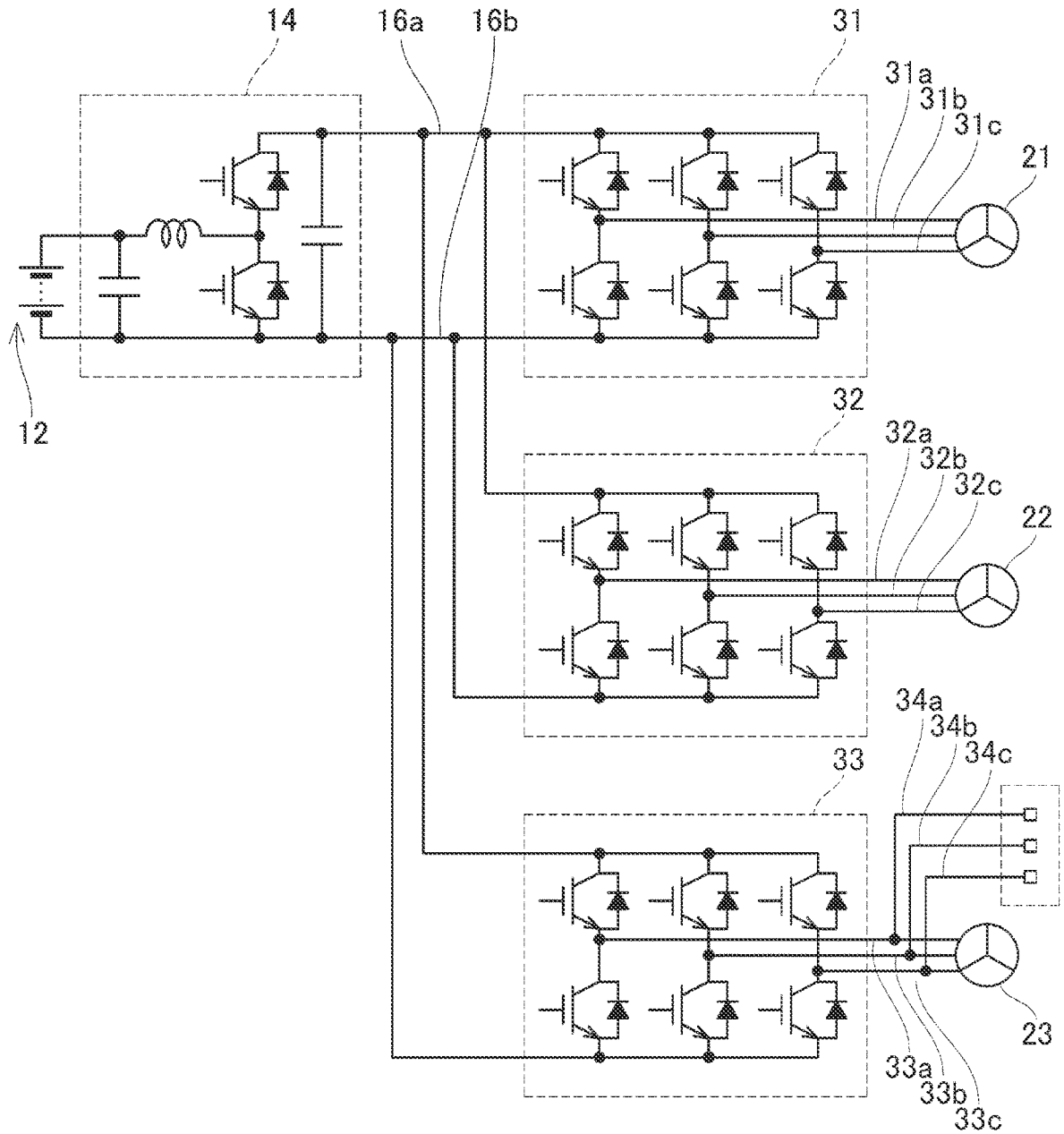
FIG. 1 is a circuit diagram showing a motor drive circuit mounted in a vehicle of one of the embodiments.

In an example of the vehicle disclosed in the present specification, the changeover device may be configured by the output connector. The output connector may be structured such that an external connector is connectable to the output connector at a first engagement position and a second engagement position. The voltage supplied from the output connector to the outside at the first engagement position may be different from the voltage supplied from the output connector to the outside at the second engagement position.

According to this configuration, the voltage supplied from the output connector to the outside can be changed over, depending on the engagement position in connecting the external connector to the output connector.

In another example of the vehicle disclosed in the present specification, the output connector may have a hexagonal engagement portion. The first engagement position may be a position where the external connector engages the engagement portion at a first angle. The second engagement position may be a position where the external connector engages the engagement portion at a second angle.

According to this configuration, the voltage supplied from the output connector to the outside can be changed over easily.

In still another example of the vehicle disclosed in the present specification, the external connector may be connected to a first external wiring line, a second external wiring line, and a third external wiring line. The first external wiring line may be connected to the first output wiring line, the second external wiring line may be connected to the second output wiring line, and the third external wiring line may be connected to the third output wiring line at the first engagement position. The first external wiring line may be connected to one of the first output wiring line, the second output wiring line, and the third output wiring line, the third external wiring line may be connected to another one of the first output wiring line, the second output wiring line, and the third output wiring line, and the second external wiring line may not be connected to any one of the first output wiring line, the second output wiring line, and the third output wiring line at the second engagement position.

According to this configuration, voltage can be output to the first external wiring line, the second external wiring line, and the third external wiring line at the first engagement position, and voltage can be output to the first external wiring line and the second external wiring line without outputting voltage to the second external wiring line at the second engagement position.

In still another example of the vehicle disclosed in the present specification, the inverter may apply a first alternating-current voltage between the first output wiring line and the second output wiring line, and apply a second alternating-current voltage that is offset in phase from the first alternating-current voltage by 180° between the second output wiring line and the third output wiring line.

According to this configuration, an alternating-current voltage with a large amplitude can be applied between the first output wiring line and the third output wiring line.

In still another example of the vehicle disclosed in the present specification, the vehicle may further have a control circuit that controls the inverter. The control circuit may control the inverter such that an alternating-current voltage is supplied from the output connector to the outside when the changeover device is in a first state. The control circuit may control the inverter such that a direct-current voltage is supplied from the output connector to the outside when the changeover device is in a second state.

According to this configuration, the voltage supplied to the outside can be changed over between an alternating-current voltage and a direct-current voltage.

First Embodiment

As shown in FIG. 1, a vehicle 10 has three motors 21 to 23. The motors 21 to 23 are motors for driving wheels of the vehicle 10 respectively. The vehicle 10 has a battery 12, a DC-DC converter 14, a high-potential wiring line 16a, a low-potential wiring line 16b, and three inverters 31 to 33.

The DC-DC converter 14 is connected to the battery 12, the high-potential wiring line 16a, and the low-potential wiring line 16b. The DC-DC converter 14 boosts a direct-current voltage supplied from the battery 12, and applies the boosted direct-current voltage to the high-potential wiring line 16a and the low-potential wiring line 16b.

The inverter 33 is connected to the high-potential wiring line 16a and the low-potential wiring line 16b. Besides, the inverter 33 has three output wiring lines 33a to 33c. The inverter 33 converts the direct-current voltage applied between the high-potential wiring line 16a and the low-potential wiring line 16b (i.e., the output voltage of the DC-DC converter 14) into a three-phase alternating-current voltage, and outputs the three-phase alternating-current voltage obtained through conversion to the output wiring lines 33a to 33c. Each of the output wiring lines 33a to 33c is connected to the motor 23. The motor 23 is driven by being supplied with the three-phase alternating-current voltage from the inverter 33. The motor 23 drives the rear wheels of the vehicle 10.

The inverter 31 has three output wiring lines 31a to 31c connected to the motor 21. The inverter 31 converts a direct-current voltage applied between the high-potential wiring line 16a and the low-potential wiring line 16b into a three-way alternating-current voltage, and outputs the three-way alternating-current voltage obtained through conversion to the output wiring lines 31a to 31c. Each of the output wiring lines 31a to 31c is connected to the motor 21. The motor 21 drives the front wheels of the vehicle.

The inverter 32 has three output wiring lines 32a to 32c connected to the motor 22. The inverter 32 converts a direct-current voltage applied between the high-potential wiring line 16a and the low-potential wiring line 16b into a three-way alternating-current voltage, and outputs the three-way alternating-current voltage obtained through conversion to the output wiring lines 32a to 32c. Each of the output wiring lines 32a to 32c is connected to the motor 22. The motor 22 drives the front wheels of the vehicle.

Besides, the motors 21 to 23 can also operate as generators. For example, the motors 21 to 23 can be made to operate as generators by transmitting rotation of an axle to the motors 21 to 23 during the running of the vehicle 10. Besides, in the case where the vehicle 10 has an engine, the motors 21 to 23 can be made to operate as generators by causing the engine to rotate rotors of the motors 21 to 23. The electric power generated by the motors 21 to 23 is supplied to the battery 12 via the inverters 31 to 33 and the DC-DC converter 14. Thus, the battery 12 is charged.

Figure 2:
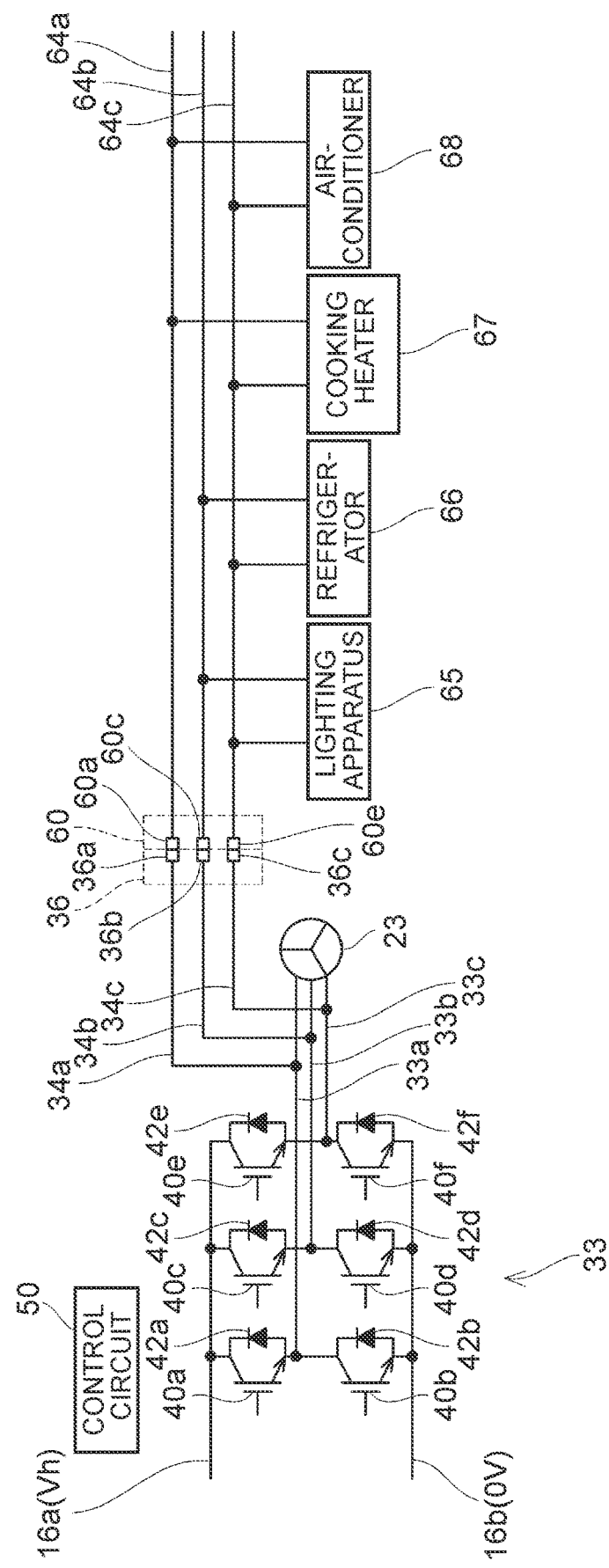
FIG. 2 is a circuit diagram showing an inverter 33 and indoor wiring lines at a first engagement position.

Next, the details of the inverter 33 will be described. Incidentally, the inverters 31 and 32 have a generally known structure, so the detailed description of the inverters 31 and 32 will be omitted. As shown in FIG. 2, the inverter 33 has switching elements 40a to 40f and diodes 42a to 42f. The switching element 40a is connected between the high-potential wiring line 16a and the output wiring line 33a. A cathode of the diode 42a is connected to a high potential-side terminal of the switching element 40a. An anode of the diode 42a is connected to a low potential-side terminal of the switching element 40a. The switching element 40b is connected between the output wiring line 33a and the low-potential wiring line 16b. A cathode of the diode 42b is connected to a high potential-side terminal of the switching element 40b. An anode of the diode 42b is connected to a low potential-side terminal of the switching element 40b. The switching element 40c is connected between the high-potential wiring line 16a and the output wiring line 33b. A cathode of the diode 42c is connected to a high potential-side terminal of the switching element 40c. An anode of the diode 42c is connected to a low potential-side terminal of the switching element 40c. The switching element 40d is connected between the output wiring line 33b and the low-potential wiring line 16b. A cathode of the diode 42d is connected to a high potential-side terminal of the switching element 40d. An anode of the diode 42d is connected to a low potential-side terminal of the switching element 40d. The switching element 40e is connected between the high-potential wiring line 16a and the output wiring line 33c. A cathode of the diode 42e is connected to a high potential-side terminal of the switching element 40e. An anode of the diode 42*e* is connected to a low potential-side terminal of the switching element 40*e*. The switching element 40*f* is connected between the output wiring line 33*c* and the low-potential wiring line 16*b*. A cathode of the diode 42*f* is connected to a high potential-side terminal of the switching element 40*f*. An anode of the diode 42*f* is connected to a low potential-side terminal of the switching element 40*f*.

The inverter 33 has a control circuit 50. Although not shown in the drawing, the control circuit 50 is connected to gate terminals of the switching elements 40*a* to 40*f*. The control circuit 50 switches the switching elements 40*a* to 40*f*. When the control circuit 50 turns on the switching element 40*a* and turns off the switching element 40*b*, a potential of the high-potential wiring line 16*a* (hereinafter referred to as a potential Vh) is applied to the output wiring line 33*a*. When the control circuit 50 turns off the switching element 40*a* and turns on the switching element 40*b*, a potential of the low-potential wiring line 16*b* (i.e., 0 V) is applied to the output wiring line 33*a*. When the control circuit 50 turns on the switching element 40*c* and turns off the switching element 40*d*, the potential Vh is applied to the output wiring line 33*b*. When the control circuit 50 turns off the switching element 40*c* and turns on the switching element 40*d*, 0 V is applied to the output wiring line 33*b*. When the control circuit 50 turns on the switching element 40*e* and turns off the switching element 40*f*, the potential Vh is applied to the output wiring line 33*c*. When the control circuit 50 turns off the switching element 40*e* and turns on the switching element 40*f*, 0 V is applied to the output wiring line 33*c*. By switching the switching elements 40*a* to 40*f*, the control circuit 50 changes the potentials of the output wiring lines 33*a* to 33*c* respectively. When the vehicle 10 runs, the control circuit 50 causes the output wiring lines 33*a* to 33*c* to generate alternating-current voltages that are offset in phase from one another by 120°. When the control circuit 50 thus causes the output wiring lines 33*a* to 33*c* to generate the three-phase alternating-current voltages respectively, the motor 23 is thereby driven. Besides, when the vehicle 10 runs, the control circuit 50 changes the frequencies and amplitudes of the three-phase alternating-current voltages output to the output wiring lines 33*a* to 33*c* respectively, in accordance with an operating state and a control target value of the motor 23.

Besides, the inverter 33 has external output wiring lines 34*a* to 34*c*. The external output wiring line 34*a* is connected to the output wiring line 33*a*. The external output wiring line 34*b* is connected to the output wiring line 33*b*. The external output wiring line 34*c* is connected to the output wiring line 33*c*. An output connector 36 is provided at end portions of the external output wiring lines 34*a* to 34*c*. By connecting an external connector 60 to the output connector 36 from outside the vehicle 10, the inverter 33 can be connected to a wiring line outside the vehicle 10. Thus, a voltage can be output from the inverter 33 to the wiring line outside the vehicle 10. For example, as shown in FIG. 2, the inverter 33 can be connected to indoor wiring lines 64*a* to 64*c* by connecting the external connector 60 provided in a house to the output connector 36 of the vehicle 10. Thus, a voltage can be output from the inverter 33 to the indoor wiring lines 64*a* to 64*c*.

A lighting apparatus 65, a refrigerator 66, a cooking heater 67, and an air-conditioner 68 are connected to the indoor wiring lines 64*a* to 64*c*. The lighting apparatus 65 and the refrigerator 66 are connected between the indoor wiring line 64*b* and the indoor wiring line 64*c*. The lighting apparatus 65 and the refrigerator 66 are instruments that operate at an alternating-current voltage of 100 V. The cooking heater 67 and the air-conditioner 68 are connected between the indoor wiring line 64*a* and the indoor wiring line 64*c*. The cooking heater 67 and the air-conditioner 68 are instruments that operate at an alternating-current voltage of 200 V.

Figure 3:
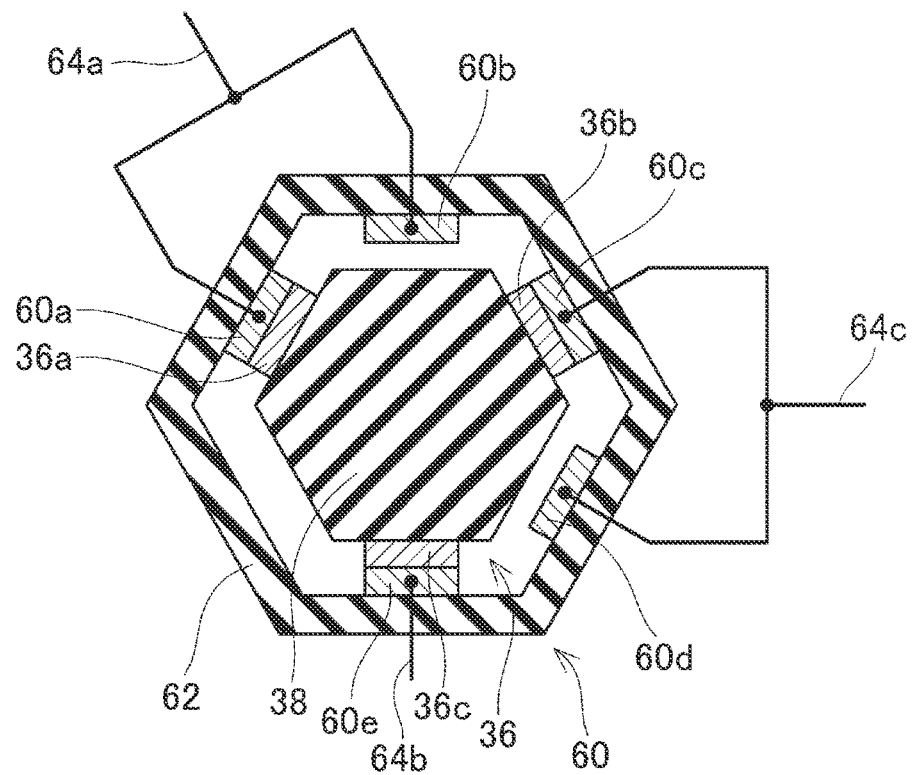
FIG. 3 is a cross-sectional view of an output connector 36 and an external connector 60 at the first engagement position.

FIG. 3 shows a cross-sectional structure of an engagement portion of the output connector 36 and the external connector 60. As shown in FIG. 3, the external connector 60 is a socket, and the output connector 36 is a plug.

The external connector 60 has a socket-shaped case 62. An inner peripheral surface of the case 62 has a regular hexagonal cross-sectional shape. Accordingly, the inner peripheral surface of the case 62 is constituted of six planes. Terminals 60*a* to 60*e* are provided on five out of the six planes constituting the inner peripheral surface of the case 62, respectively. No terminal is provided on the other out of the six planes constituting the inner peripheral surface of the case 62. The terminal 60*a* and the terminal 60*b* are connected to the indoor wiring line 64*a*, the terminal 60*c* and the terminal 60*d* are connected to the indoor wiring line 64*c*, and the terminal 60*e* is connected to the indoor wiring line 64*b*.

The output connector 36 has a plug-shaped base body 38. An outer peripheral surface of the base body 38 has a regular hexagonal cross-sectional shape. Accordingly, the outer peripheral surface of the base body 38 is constituted of six planes. Terminals 36*a* to 36*c* are provided on three out of the six planes constituting the outer peripheral surface of the base body 38, respectively. No terminal is provided on the other three out of the six planes constituting the outer peripheral surface of the base body 38. The planes on which no terminal is provided exist between the planes on which the terminals 36*a* to 36*c* are provided, respectively. The terminal 36*a* is connected to the external output wiring line 34*a*, the terminal 36*b* is connected to the external output wiring line 34*b*, and the terminal 36*c* is connected to the external output wiring line 34*c*. The output connector 36 is formed in such a shape as to be insertable into the external connector 60.

As shown in FIG. 3, when the output connector 36 is inserted into the external connector 60 at a position where the terminal 36*a* of the output connector 36 is in contact with the terminal 60*a* of the external connector 60 (hereinafter referred to as a first engagement position), the terminal 36*b* of the output connector 36 is connected to the terminal 60*c* of the external connector 60, and the terminal 36*c* of the output connector 36 is connected to the terminal 60*e* of the external connector 60. In this state, as shown in FIG. 2, the external output wiring line 34*a* is connected to the indoor wiring line 64*a*, the external output wiring line 34*b* is connected to the indoor wiring line 64*b*, and the external output wiring line 34*c* is connected to the indoor wiring line 64*c*.

Figure 4:
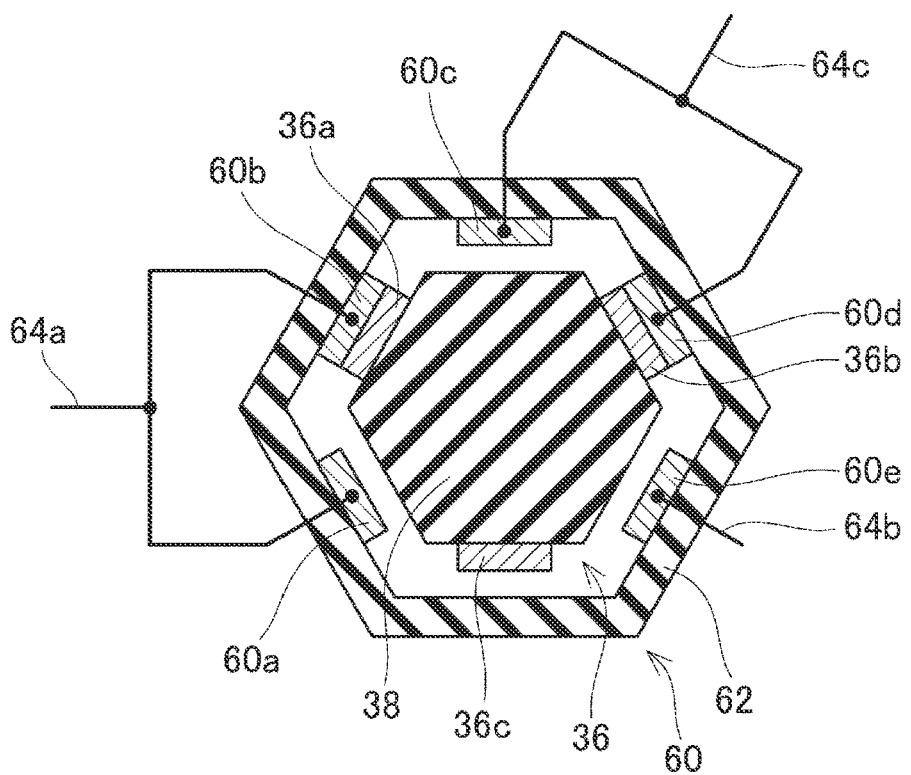
FIG. 4 is a cross-sectional view of the output connector 36 and the external connector 60 at a second engagement position.
Figure 5:
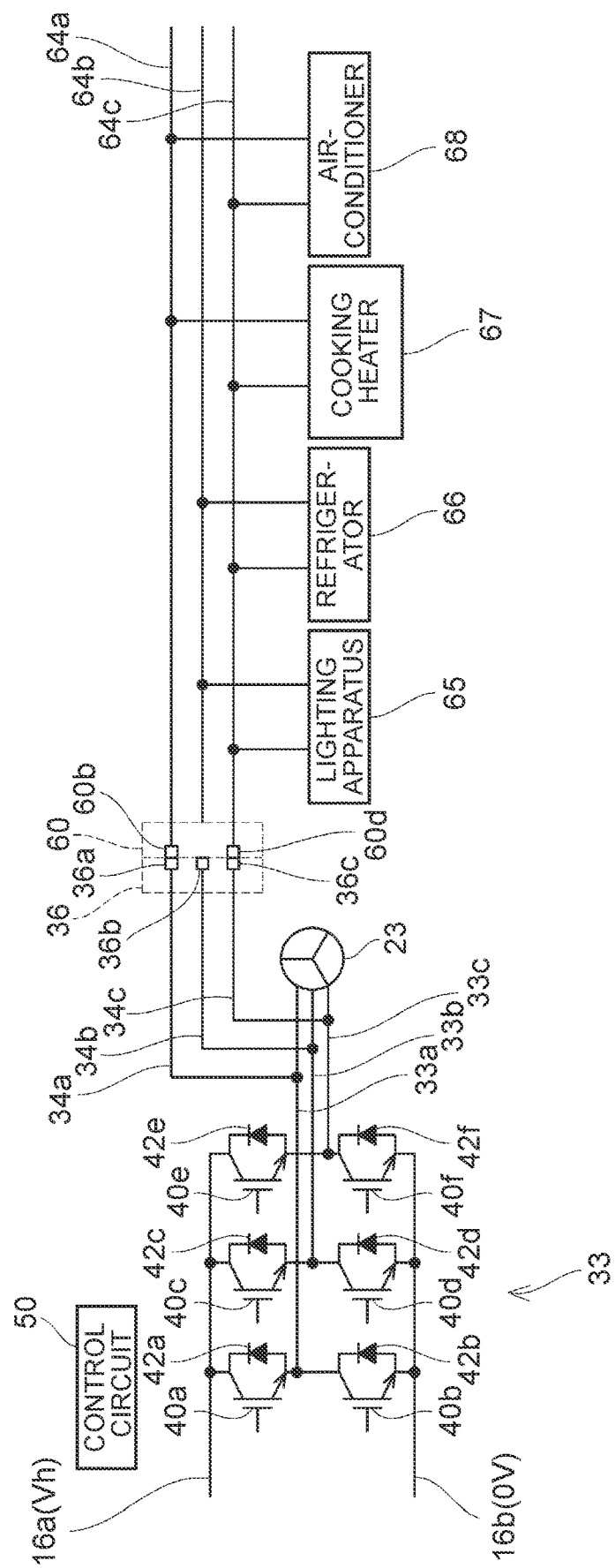
FIG. 5 is a circuit diagram showing the inverter 33 and the indoor wiring lines at the second engagement position.

Besides, as shown in FIG. 4, the output connector 36 can be inserted into the external connector 60 at a position where the external connector 60 is rotated around an axis thereof by 60° with respect to the output connector 36 from the position shown in FIG. 3 (hereinafter referred to as a second engagement position) as well. At the second engagement position, the terminal 36*a* of the output connector 36 is connected to the terminal 60*b* of the external connector 60, and the terminal 36*b* of the output connector 36 is connected to the terminal 60*d* of the external connector 60. Besides, at the second engagement position, the terminal 36*c* of the output connector 36 is not connected to any one of the terminals of the external connector 60. In this state, as shown in FIG. 5, the external output wiring line 34*a* is connected to the indoor wiring line 64*a*, and the external output wiring line 34*c* is connected to the indoor wiring line 64c, whereas the external output wiring line 34b is not connected to the indoor wiring line 64b.

By thus changing the angle of connection between the output connector 36 and the external connector 60, the state of connection between the external output wiring lines 34a to 34c and the indoor wiring lines 64a to 64c can be changed.

Figure 6:
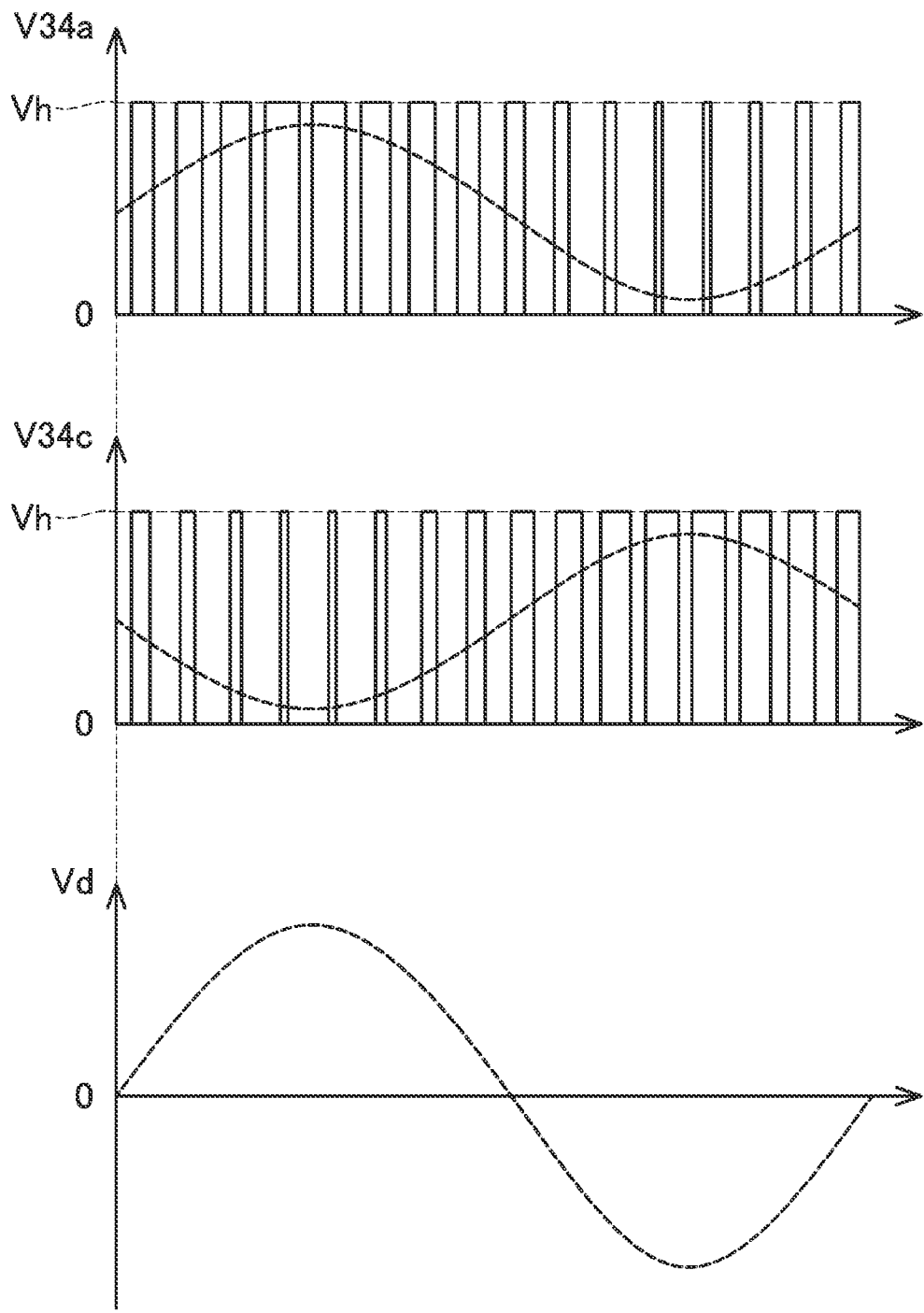
FIG. 6 includes graphs showing output voltages of the inverter 33 during an external output operation respectively.

Next, an external output operation of the inverter 33 will be described. When a predetermined manipulation is carried out in the vehicle 10 with the external connector 60 connected to the output connector 36, the inverter 33 performs the external output operation. FIG. 6 shows output voltages V34a, V34c, and Vd during the external output operation. The output voltage V34a corresponds to a potential of the external output wiring line 34a with respect to the external output wiring line 34b. The output voltage V34c corresponds to a potential of the external output wiring line 34c with respect to the external output wiring line 34b. The output voltage Vd corresponds to a potential of the external output wiring line 34a with respect to the external output wiring line 34c. That is, the output voltage Vd is a value obtained by subtracting the output voltage V34c from the output voltage V34a. Besides, in FIG. 6, solid lines in graphs show how the actual voltages change respectively, and broken lines in the graphs show values obtained by integrating the values indicated by the solid lines in the graphs by a certain time respectively. As indicated by the solid lines in FIG. 6, the control circuit 50 alternately and periodically outputs the voltage Vh and 0 V as the output voltages V34a and V34c, while adjusting the duty ratio thereof. Thus, as indicated by the broken lines in FIG. 6, the control circuit 50 generates, in a pseudo manner, an alternating-current voltage as the external output wiring lines 34a and 34c. In the external output operation, the control circuit 50 performs control such that each of the output voltages V34a and V34c becomes an alternating-current voltage that changes with a certain frequency and a certain amplitude. In more concrete terms, the control circuit 50 performs control such that each of the output voltages V34a and V34c becomes the alternating-current voltage of 100 V. Besides, the control circuit 50 performs control such that the output voltage V34a and the output voltage V34c are offset in phase from each other by 180°. Accordingly, the output voltage Vd is the alternating-current voltage of 200 V.

As shown in FIGS. 2 and 3, at the first engagement position, the external output wiring line 34a is connected to the indoor wiring line 64a, the external output wiring line 34b is connected to the indoor wiring line 64b, and the external output wiring line 34c is connected to the indoor wiring line 64c. Accordingly, the voltage Vd (i.e., the alternating-current voltage of 200 V) is applied between the indoor wiring line 64a and the indoor wiring line 64c, and the voltage V34c (i.e., the alternating-current voltage of 100 V) is applied between the indoor wiring line 64b and the indoor wiring line 64c, by the inverter 33. Accordingly, the alternating-current voltage of 200 V is supplied to the cooking heater 67 and the air-conditioner 68, and the alternating-current voltage of 100 V is supplied to the lighting apparatus 65 and the refrigerator 66, by the inverter 33. As described hitherto, at the first engagement position, voltage is supplied from the inverter 33 to both the instruments for 200 V and the instruments for 100 V.

As shown in FIGS. 4 and 5, at the second engagement position, the external output wiring line 34a is connected to the indoor wiring line 64a, and the external output wiring line 34c is connected to the indoor wiring line 64c, whereas the external output wiring line 34b is not connected to the indoor wiring line 64b. Accordingly, the voltage Vd (i.e., the alternating-current voltage of 200 V) is applied between the indoor wiring line 64a and the indoor wiring line 64c by the inverter 33, whereas no voltage is supplied between the indoor wiring line 64b and the indoor wiring line 64c from the inverter 33. Therefore, the alternating-current voltage of 200 V is supplied from the inverter 33 to the cooking heater 67 and the air-conditioner 68, but no voltage is supplied from the inverter 33 to the lighting apparatus 65 and the refrigerator 66. As described hitherto, at the second engagement position, voltage is supplied from the inverter 33 to the instruments for 200 V, but no voltage is supplied from the inverter 33 to the instruments for 100 V.

As described hitherto, according to the vehicle of the first embodiment, a changeover can be made between the state where both the alternating-current voltage of 200 V and the alternating-current voltage of 100 V are supplied from the inverter 33 to the outside and the state where only the alternating-current voltage of 200 V is supplied from the inverter 33 to the outside. In particular, by simply changing the angle of connection between the output connector 36 and the external connector 60, the state of supply of the alternating-current voltage from the inverter 33 to the outside can be changed easily.

Besides, in the vehicle of the first embodiment, the output voltage of the inverter 33 (i.e., the voltage of the output wiring lines 33a to 33c) is supplied to the outside. Therefore, voltage can be supplied to the outside by the single inverter 33. Accordingly, when the external output operation is performed by the inverter 33, other operations can be performed by the inverters 31 and 32. For example, an operation of generating electric power in the motors 21 and 22 through the use of the engine or the like and supplying the generated electric power to the battery 12 via the inverters 31 and 32 can be performed.

Second Embodiment

In the inverter 33 of the second embodiment, an external supply operation at the second engagement position is different from that of the first embodiment. The external supply operation of the inverter 33 at the first engagement position in the second embodiment is identical to that of the first embodiment (i.e., FIGS. 2 and 6). Accordingly, the external supply operation of the inverter 33 at the second engagement position in the second embodiment will be described hereinafter.

Figure 7:
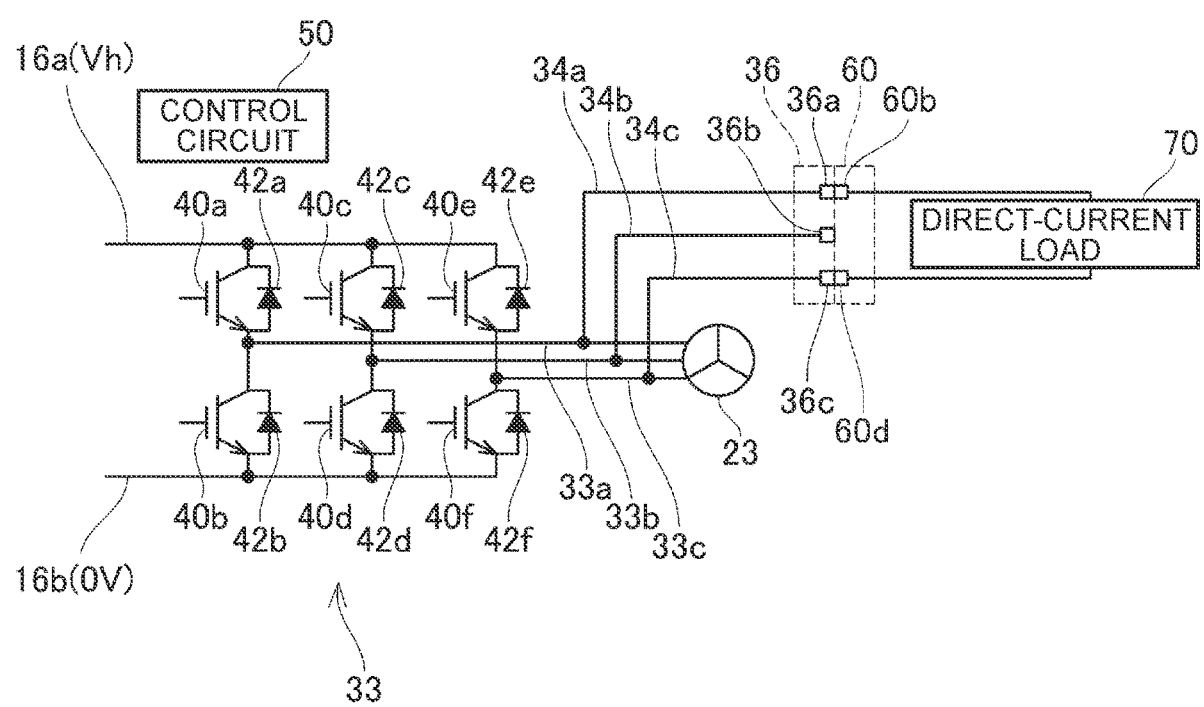
FIG. 7 is a circuit diagram showing the inverter 33 and a direct-current load at the second engagement position.

FIG. 7 shows the external supply operation of the inverter 33 at the second engagement position in the second embodiment. In FIG. 7, an electric power supply connector of a direct-current load 70 is connected to the output connector 36 as the external connector 60. In FIG. 7, the external connector 60 is connected to the output connector 36 at the second engagement position. The direct-current load 70 has a plus wiring line 82 and a minus wiring line 84. When the external connector 60 is connected to the output connector 36 at the second engagement position, the plus wiring line 82 is connected to the external output wiring line 34a, and the minus wiring line 84 is connected to the external output wiring line 34c.

In the second embodiment, the control circuit 50 senses whether the output connector 36 is connected to the external connector 60 at the first engagement position or at the second engagement position. In the case of the second engagement position, the control circuit 50 performs control to turn on the switching element 40a, turn off the switching element 40b, turn off the switching element 40e, and turn on the switching element 40f. Accordingly, the voltage Vh is constantly applied to the external output wiring line 34a, and 0 V is constantly supplied to the external output wiring line 34c. Therefore, the direct-current voltage Vh is applied between the external output wiring line 34a and the external output wiring line 34c. Accordingly, the direct-current voltage Vh is supplied to the direct-current load 70 via the plus wiring line 82 and the minus wiring line 84. Incidentally, the magnitude of the direct-current voltage applied between the external output wiring line 34a and the external output wiring line 34c may be adjusted to a value lower than the voltage Vh, by adjusting the time during which the switching elements 40a and 40f are on.

As described hitherto, in the second embodiment, an alternating-current voltage is supplied from the inverter 33 to the outside at the first engagement position, and a direct-current voltage is supplied from the inverter 33 to the outside at the second engagement position. That is, in the second embodiment, a changeover can be made between the state where the alternating-current voltage is supplied from the inverter 33 to the outside and the state where the direct-current voltage is supplied from the inverter 33 to the outside.

Incidentally, in the foregoing first and second embodiments, the voltage output to the outside is changed over depending on the angle of connection of the external connector 60 with respect to the output connector 36. That is, the changeover device that changes over the voltage output to the outside is configured by the output connector 36. However, the changeover device that changes over the voltage output to the outside may be configured by a switch or the like.

Besides, in the foregoing first embodiment, two alternating-current voltages are supplied to the outside at the first engagement position, and a single alternating-current voltage is supplied to the outside at the second engagement position. Besides, in the foregoing second embodiment, an alternating-current voltage is supplied to the outside at the first engagement position, and a direct-current voltage is supplied to the outside at the second engagement position. However, the magnitude of the voltage supplied to the outside, the frequency of the voltage, and the like may be changed between the first engagement position and the second engagement position.

Besides, in the foregoing first and second embodiments, the output connector 36 is a plug, and the external connector 60 is a socket. However, the output connector 36 may be a socket, and the external connector 60 may be a plug.

The indoor wiring line 64a of the embodiments is an example of the first external wiring line. The indoor wiring line 64b of the embodiments is an example of the second external wiring line. The indoor wiring line 64c of the embodiments is an example of the third external wiring line.

The embodiments have been described above in detail, but are nothing more than exemplifications, and do not limit the claims. The art described in the claims encompasses various modifications and alterations of the concrete examples exemplified above. The technical elements described in the present specification or the drawings are technically useful either alone or in various combinations, and are not limited to the combinations described in the claims at the time of the filing of the application. Besides, the art exemplified in the present specification or the drawings achieves a plurality of objects at the same time, and is technically useful by achieving one of the objects in itself.

What is claimed is:

1. A vehicle comprising:
an inverter that is configured to apply a voltage to a first output wiring line, a second output wiring line, and a third output wiring line;
a motor that is connected to the first output wiring line, the second output wiring line, and the third output wiring line, and is configured to drive a wheel;
an output connector that is configured to supply the voltage applied to the first output wiring line, the second output wiring line, and the third output wiring line to an outside; and
a changeover device that is configured by the output connector and is configured to change over the voltage supplied from the output connector to the outside, wherein
the output connector has a hexagonal engagement portion and is structured such that an external connector is connectable to the output connector at a first engagement position and a second engagement position,
the first engagement position is a position where the external connector engages the engagement portion at a first angle,
the second engagement position is a position where the external connector engages the engagement portion at a second angle, and
the voltage supplied from the output connector to the outside at the first engagement position is different from the voltage supplied from the output connector to the outside at the second engagement position.

2. The vehicle according to claim 1, wherein
the external connector is connected to a first external wiring line, a second external wiring line, and a third external wiring line,
at the first engagement position,
the first external wiring line is connected to the first output wiring line,
the second external wiring line is connected to the second output wiring line, and
the third external wiring line is connected to the third output wiring line, and
at the second engagement position,
the first external wiring line is connected to one of the first output wiring line, the second output wiring line, and the third output wiring line,
the third external wiring line is connected to another one of the first output wiring line, the second output wiring line, and the third output wiring line, and
the second external wiring line is not connected to any one of the first output wiring line, the second output wiring line, and the third output wiring line.

3. The vehicle according to claim 1, wherein the inverter is configured to
apply a first alternating-current voltage between the first output wiring line and the second output wiring line, and
apply a second alternating-current voltage that is offset in phase from the first alternating-current voltage by 180° between the second output wiring line and the third output wiring line.

4. The vehicle according to claim 1, further comprising:
a control circuit that is configured to control the inverter, wherein
the control circuit is configured to control the inverter such that an alternating-current voltage is supplied from the output connector to the outside when the changeover device is in a first state, and the control circuit is configured to control the inverter such that a direct-current voltage is supplied from the output connector to the outside when the changeover device is in a second state.

* * * * *